Dec. 21, 1937.　　　　F. W. MERRILL　　　　2,103,165
SELF STARTING SYNCHRONOUS INDUCTOR MOTOR
Filed July 22, 1936

Inventor:
Frank W. Merrill,
by Harry E. Dunham
His Attorney.

Patented Dec. 21, 1937

2,103,165

UNITED STATES PATENT OFFICE 2,103,165

SELF STARTING SYNCHRONOUS INDUCTOR MOTOR

Frank W. Merrill, Fort Wayne, Ind., assignor to General Electric Company, a corporation of New York Application July 22, 1936, Serial No. 91,923

10 Claims. (Cl. 172—120)

My invention relates to improvements in synchronous inductor motors, and its main object is to obtain good starting torque in a predetermined direction of rotation in such motors. A further object is to produce a synchronous inductor motor having half the number of rotor salients as the conventional reluctance motor. A still further object is to simplify the construction of such motors by utilizing high coercive force permanent magnet material as the source of the unidirectional flux therein.

The ordinary inductor motor has no continuous starting torque but depends upon rotary vibrations induced by cyclic flux pulsations of different sign to vibrate the rotor into a condition of synchronism. When the frequency is high or when the inertia of the rotor is considerable or when there exists a combination of these factors, the ordinary inductor motor will not start satisfactorily by itself. According to my invention, I overcome this difficulty by providing a rotating field component in the motor and using a squirrel cage winding or its equivalent to produce positive starting torque and bring the motor up to its synchronous speed.

In applying a squirrel cage winding or its equivalent to an inductor motor so as to obtain the full benefit thereof for starting purposes it is necessary that the rotating field component shall be continuous in space and be high enough to produce appreciable induction motor starting action. This is a condition which so far as I am aware has not heretofore been realized in inductor motors. It is also important that the direct current or unidirectional flux in the motor shall not induce currents in the squirrel cage winding during starting or during synchronous operation.

According to my invention I arrange the motor parts so that a large rotating A. C. field component is obtained for induction motor starting purposes without inducing damping currents in the induction motor secondary due to the unidirectional flux which necessarily exists in this type of motor both during starting and during synchronous operation if permanent magnet excitation is used and, in any event, during synchronous operation where the operating unidirectional flux is supplied by a D. C. exciting winding which may be opened during starting. At standstill the tooth relationship between stator and rotor should be and is made such that no appreciable locking torque is produced by the D. C. flux.

Figure 1:
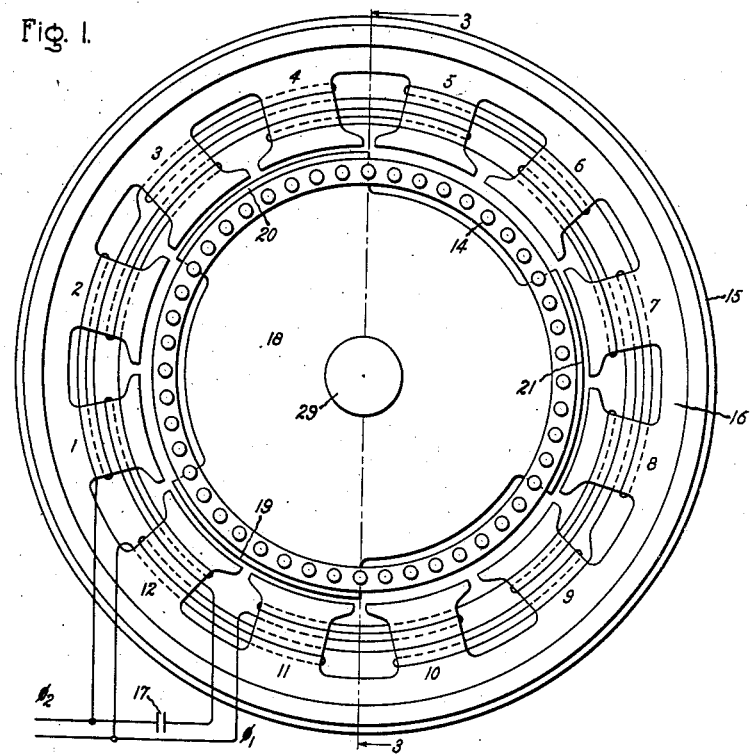
Figure 3:
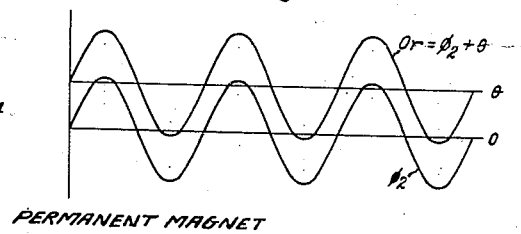
Figure 4:
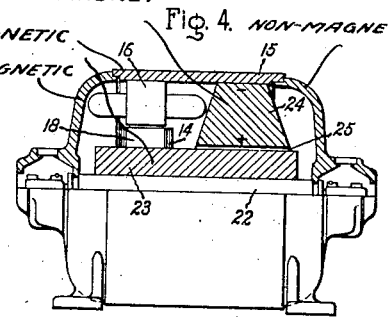

The features of my invention which are believed to be novel and patentable will be pointed out in the claims appended hereto. For a better understanding of my invention, reference is made in the following description to the accompanying drawing wherein Fig. 1 represents an end view and Fig. 2 a cross-sectional view of a two phase, self-starting, squirrel cage synchronous inductor motor having a rotary permanent magnet for producing the unidirectional flux; Fig. 3 are flux curves explanatory of the action of the motor of Fig. 1; and Fig. 4 shows a further structural arrangement of the motor where the permanent magnet is stationary.

Figure 2:
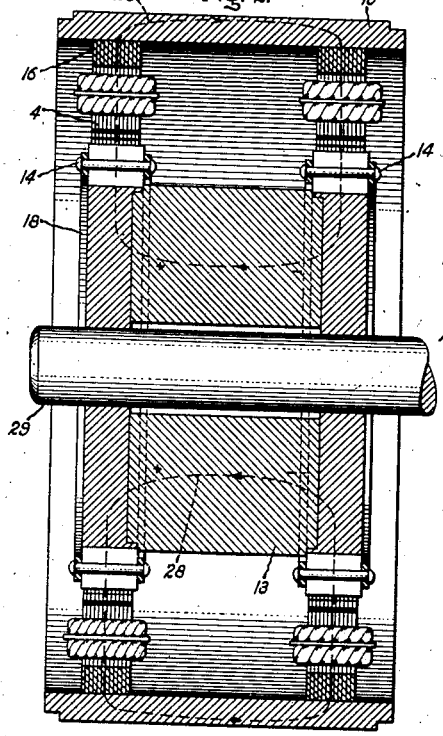

Referring now to Figs. 1 and 2. This structure represents a relatively high speed inductor motor structure which is started as an induction motor. As seen in Fig. 2 the structure represents in fact two axially spaced motors on the same shaft utilizing the same permanent magnet 13 for supplying the unidirectional flux of both. These units could be made for different operating speeds and only one energized at a time in which case the idle unit would simply comprise a return path for the unidirectional flux for the motor being used. For purposes of this description, it will be assumed that both units of Fig. 2 are similar inductor motor units, each having a stator and rotor arrangement best shown in Fig. 1 and that therefore they may be energized in parallel for simultaneous use. 15 represents a magnetic stator framework for both units and extending between them. Each stator or primary is provided with a laminated magnetic core structure 16 having twelve inwardly projecting salients or pole pieces which for convenience are numbered from 1 to 12. This stator structure carries a two-phase winding, the leads of which are designated $\phi_1$ and $\phi_2$. These circuits may be energized from a two phase circuit or in parallel from a single phase circuit with phase split. The latter using a condenser phase advancer 17 is represented.

It will be noted that salients 12 and 1 are embraced by the first coil of the $\phi_1$ circuit and we may consider these salients together as a positive $\phi_1$ pole; similarly salients 2 and 3 represent a negative $\phi_1$ pole, salients 4 and 5 a positive $\phi_1$ pole, salients 6 and 7 a negative $\phi_1$ pole, salients 8 and 9 a positive $\phi_1$ pole and salients 10 and 11 a negative $\phi_1$ pole. Thus there are six alternate north and south $\phi_1$ poles, each pole being formed of two salients embraced by a single coil. It will further be noted that salients 1 and 2 are embraced by a $\phi_2$ coil and together form a positive $\phi_2$ pole. Salients 3 and 4 form the next negative $\phi_2$ pole and so on about the stator, making 6 $\phi_2$ poles of alternate polarity each having two salients belonging to different polarity adjacent $\phi_1$ poles. It is evident that this arrangement will produce a two phase 6 pole rotating magnetic field which we may assume to rotate clockwise at 1200 R. P. M. if we use 60 cycle A. C. excitation. This field acts on a magnetic rotor or secondary 18 having three uniformly spaced salient pole pieces 19, 20 and 21, and carrying a squirrel cage form of induction motor secondary winding 14.

The rotors are carried on a central shaft 29 and between them about the shaft is the permanent magnet 13, which is polarized axially so as to produce a unidirectional flux represented by dotted lines 28 axially between the two rotors radially outward through one rotor 18 into the stator salients, axially through the stator shell 15 and inwardly through the other stator and rotor completing the homopolar unidirectional excitation of both motor elements. This unidirectional excitation flows outwardly mostly through the rotor salients 19, 20 and 21 to the adjacent stator salients in the rotor position represented in Fig. 1 and it will be evident that considering this flux alone there will be a negligible locking torque at standstill as in any rotor position a rotor salient is opposite approximately the same stator salient area.

In explaining the inductor motor action let $\phi_2$ Fig. 3 represent the A. C. flux produced by the $\phi_2$ winding in the six north and south poles of the stator at the instant when this flux is a maximum referred to a zero line 0. Let $\theta$ represent the constant unidirectional flux flowing from rotor 18 to stator 16. Then the resultant flux $O_r$ will be the algebraic sum of $\phi_2$ and $\theta$ as represented. It will be noted that if the unidirectional flux per pole be made approximately equal to the maximum A. C. flux per pole, the resultant is practically a unidirectional pulsating flux so that it may be assumed that at alternate $\phi_2$ poles—that is all $\phi_2$ poles of one polarity—the D. C. and A. C. fluxes cancel approximately while at the remaining $\phi_2$ poles the D. C. and A. C. fluxes add. The resultant flux may therefore be considered as a pulsating three pole field, the three poles being of the same polarity. The $\phi_1$ fluxes may be treated similarly so that the resultant flux of the motor (the combination of the $\phi_1$, $\phi_2$ and unidirectional fluxes) may be considered as a three pole rotating magnetic field which rotates at the same speed as the A. C. six pole field and in the same direction. The synchronous inductor motor speed for the six pole stator will therefore be 1200 R. P. M. on 60 cycles but this 1200 R. P. M. speed is obtained with a rotor having only half the number of salient poles as compared with the normal multipolar rotating magnetic field synchronous motor.

Now considering the starting torque produced by the reaction of this field on the squirrel cage winding 14, it will be evident that the unidirectional flux will have no effect thereon at any time because the D. C. flux through the induction motor secondary or squirrel cage is constant and in one direction. The unidirectional flux will therefore induce no current in the squirrel cage and produce no damping torque due to the squirrel cage winding at any time.

The six pole revolving field A. C. flux component, however, does cut the squirrel cage and produces a strong induction motor starting torque which brings the rotor up to the synchronous speed of 1200 R. P. M. The A. C. flux component has no tendency to pass into the permanent magnet 13 and consequently there is no demagnetizing effect thereon. The unidirectional magnetization improves the power factor of the motor. Due to the pulsation of the resultant flux through the stator saliients instead of a complete flux reversal as in a normal A. C. motor, the iron losses are not so great as in the normal A. C. motor.

The second motor element shown in Fig. 2 simply doubles the load capacity of the combination without requiring any additional source of unidirectional flux. It will be evident that a direct current winding might be substituted for the permanent magnet 13 but if I use one of the high coercive force materials for 13 I may use a relatively short magnet resulting in a compact structure that requires no slip rings on D. C. field leads. The material which I prefer to use for the permanent magnet is an alloy of aluminum, cobalt, nickel and iron more fully described in United States Patent 1,968,569—Ruder July 31, 1934.

The motor of Figs. 1 and 2 represents a suitable design for relatively high speeds but of course the invention is not confined to the particular pole number and speed described.

Fig. 4 represents an alternative arrangement of the permanent magnet for a single motor. Here 15 represents a stator shell of magnetic material, 16 an inductor motor primary stator and 18 an inductor motor secondary rotor provided with a squirrel cage winding 14, 22 is the rotor shaft and 23 a heavy magnetic flux carrier pressed between the rotor laminations and shaft. An extension of part 23 has its outer surface facing the pole face of a doughnut shaped permanent magnet 24 across a narrow air gap at 25. The permanent magnet is stationary, it is polarized radially, and its outer circumference which constitutes its other pole is pressed into the stator shell 15. The motor end shields are made of non-magnetic material. The unidirectional flux thus passes through the shell 15 in one axial direction to the motor stator, then radially into the rotor and back through the flux carrier 23 to the inner pole of the permanent magnet. By using the high coercive force material previously mentioned, it is possible to obtain good permanent magnets of the shape represented with radial polarity. The outer circumference of this permanent magnet is thinner in an axial direction than is the inner circumference to equalize the flux density therethrough as the outer face has a greater area per unit length than the inner face. These permanent magnets are made as castings and are very hard. However, it is only necessary to provide a finished surface at the pole faces in the examples shown.

In an application (Serial No. 91,924) filed concurrently herewith, I have described an inductor motor generator set employing the inductor motor described herein where a common permanent magnet is employed to supply the unidirectional flux of both inductor machines and claim is made in said application to such feature.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. An inductor motor comprising cooperating, relatively rotatable, primary and secondary members, said primary member being provided with salient magnetic pole pieces and with a multipolar alternating-current winding means for producing a rotating magnetic field, said secondary member being provided with salient magnetic pole pieces of one-half the pole number of the alternating-current winding and with an induction motor secondary winding responsive to the rotating magnetic field of the primary to produce starting torque, and means for producing a unidirectional flux in one direction only between the primary and secondary members to which the induction motor secondary winding is nonresponsive but which in combination with the rotating magnetic field causes synchronous inductor motor operation.

2. An inductor motor comprising cooperating rotor and stator members, said rotor member being provided with an induction motor secondary winding and with magnetic core material providing salient pole pieces, said stator member being provided with an alternating-current winding wound for twice as many poles as there are salient pole pieces in the rotor which winding, when energized, produces a magnetic field having a rotating component capable of starting said rotor by induction motor action and having magnetic material providing salient pole pieces, and means for producing a unidirectional flux in one direction only between the stator and rotor members which flux in combination with the magnetic field produced by the alternating-current stator winding causes synchronous inductor motor operation.

3. A synchronous inductor motor having a primary provided with multipolar alternating-current winding means for producing a rotating magnetic field, a salient pole magnetic rotor cooperating with said stator having one-half the number of salient poles as the pole number of the alternating-current winding, means for producing a unidirectional flux in one direction only between stator and rotor such that the resultant field in the motor causes synchronous inductor motor operation thereof, and an induction motor secondary winding on said rotor influenced only by the component of the resultant field produced by the alternating-current winding means and effective to start said rotor and accelerate it to the synchronous inductor motor speed.

4. An inductor motor comprising cooperating, relatively rotatable, primary and secondary members, said primary member being provided with an alternating-current winding for producing a multipolar rotating magnetic field, said secondary member being provided with magnetic core material providing salient pole pieces equal in number to one half the number of poles of the primary rotating magnetic field, and means for producing a unidirectional flux in one direction only between primary and secondary members which combines with the flux of the multipolar rotating magnetic field to produce a resultant rotating magnetic field between primary and secondary members having a pole number equal to the salient pole pieces of the secondary whereby synchronous inductor motor operation is produced at a speed equal to the speed of the multipolar rotating magnetic field of the primary.

5. An inductor motor comprising cooperating, relatively rotatable, primary and secondary members, said primary member having an alternating-current winding for producing a multipolar rotating magnetic field, said secondary member comprising a magnetic core member having a number of salient pole pieces equal in number to one half the poles of the multipolar rotating magnetic field and an induction motor secondary winding responsive to said multipolar rotating magnetic field to produce starting torque, and means for producing a constant homopolar unidirectional flux between primary and secondary members having no influence on the induction motor secondary winding but combining with said multipolar rotating magnetic field to produce a resultant rotating magnetic field of the same speed but of a pole number equal to the salient pole piece number of the secondary and productive of synchronous inductor motor operation.

6. A synchronous inductor motor comprising cooperative, relatively rotatable, primary and secondary members, said primary member being provided with salient magnetic pole pieces and with a polyphase multipolar alternating-current winding for producing a rotating magnetic field, said secondary being provided with salient magnetic poles equal in number to one half the poles of the polyphase rotating magnetic field, a squirrel cage winding on said secondary responsive to the rotating magnetic field to produce starting torque, and permanent-magnet means producing a unidirectional flux in one direction only between stator and rotor such that, when combined with the rotating magnetic field of the primary, there is produced a resultant rotating magnetic field between stator and rotor having a pole number equal to the salient pole piece number of the secondary, said unidirectional field producing no current in the squirrel cage winding at any time, the reluctance between stator and rotor being substantially constant in all rotor positions whereby there is no appreciable locking tendency in the motor at standstill.

7. An inductor motor comprising a laminated magnetic stator member provided with an even number of inwardly projecting salient pole pieces, a two-phase alternating-current winding thereon comprising coils wound about adjacent pairs of stator pole pieces, the coils of one phase overlapping the coils of the other phase by one such salient pole piece such that a pair of adjacent pole pieces constitutes a magnetic pole of one phase and the separate pole pieces of such pair constitute halves of magnetic poles of different polarity of the other phase to produce a two-phase rotating magnetic field having half the number of magnetic poles as there are salient pole pieces in the stator, a rotor of magnetic material having evenly spaced salient pole pieces which together occupying one half the rotor periphery and which number one fourth the number of salient pole pieces of the stator, and means for producing a unidirectional magnetic field between stator and rotor in one direction only which when combined with the rotating magnetic field produced by the two-phase winding, results in a rotating magnetic field having a pole number and distribution corresponding to the salient pole piece number and distribution of the rotor.

8. A synchronous inductor motor unit comprising a pair of axially displaced primary members and a pair of similarly displaced secondary members respectively cooperating with said primary members, the primary and secondary members being relatively rotatable, the primary members being connected together by a magnetic shell and each having laminated core material energized by polyphase alternating-current windings for producing multipolar rotating magnetic fields in the cooperating secondary members, said secondary members having magnetic core material provided with salient pole pieces and with induction motor secondary windings influenced by the rotating magnetic fields of the primary members to produce starting torque, and a permanent magnet extending between the core members of the secondaries for producing homopolar unidirectional fluxes between both pairs of primary and secondary members in series to produce synchronous inductor motor operation therein, said unidirectional flux having no influence on the induction motor secondary windings and producing no appreciable locking torque between either pair of primary and secondary members at standstill.

9. An inductor motor comprising a laminated stator member provided with an alternating-current winding for producing a rotating magnetic field, a cooperating rotor member having magnetic core material providing salient magnetic pole pieces, an induction motor secondary winding on said rotor member influenced by the rotating magnetic field of the stator member to produce starting torque, a magnetic shell supporting the stator laminations and extending axially therefrom, a doughnut shaped permanent magnet concentrically supported within the axially extended portion of said magnetic shell, and a magnetic member coaxial with said rotor extending from its core through the central opening in the doughnut shaped permanent magnet, said permanent magnet being polarized in a radial direction and serving to produce a homopolar unidirectional flux between said stator and rotor members.

10. A pair of synchronous inductor motors placed side by side and having a common rotor axis, each motor comprising cooperating stator and rotor members, the stator members each having laminated magnetic core material energized with alternating-current windings and the rotors each having magnetic core material provided with salient poles, a magnetic connection between the outer portions of said stator members external to the alternating-current windings thereon such that no alternating flux component is produced in said connection by such windings and a magnetic connection between the inner portions of said rotor core members, one of said magnetic connections comprising an annular permanent magnet polarized in the axial direction of said motor effective to produce homopolar unidirectional magnetic fluxes between the stator and rotor of each motor, the magnitude of such unidirectional flux per salient rotor pole being approximately of the same magnitude as the maximum alternating-current flux per salient rotor pole.

FRANK W. MERRILL.